US010922268B2

(12) United States Patent
Hardy et al.

(10) Patent No.: US 10,922,268 B2
(45) Date of Patent: Feb. 16, 2021

(54) MIGRATING DATA FROM A SMALL EXTENT POOL TO A LARGE EXTENT POOL

(71) Applicant: International Business Machines Corporation, Armonk, NY (US)

(72) Inventors: Clint A. Hardy, Tucson, AZ (US); Hui Zhang, Shanghai (CN); Karl A. Nielsen, Tucson, AZ (US); Qiang Xie, Shanghai (CN); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/118,367

(22) Filed: Aug. 30, 2018

(65) Prior Publication Data

US 2020/0073955 A1   Mar. 5, 2020

(51) Int. Cl.
*G06F 16/11* (2019.01)
(52) U.S. Cl.
CPC .......... *G06F 16/119* (2019.01); *G06F 16/122* (2019.01)
(58) Field of Classification Search
CPC ...... G06F 3/0647; G06F 3/067; G06F 3/0685; G06F 3/061; G06F 3/0644
See application file for complete search history.

(56) References Cited

U.S. PATENT DOCUMENTS

| | | | |
|---|---|---|---|
| 5,920,703 | A | 7/1999 | Campbell et al. |
| 7,970,991 | B2 | 6/2011 | Abe |
| 8,019,965 | B2 | 9/2011 | Agombar et al. |
| 8,719,533 | B2 | 5/2014 | Terayama et al. |
| 9,128,636 | B2 | 9/2015 | Arakawa |
| 9,575,659 | B2 | 2/2017 | Coronado et al. |
| 9,996,562 | B2 | 6/2018 | Higginson et al. |
| 2008/0235300 | A1 | 9/2008 | Nemoto et al. |
| 2011/0202732 | A1 | 8/2011 | Montgomery |

(Continued)

FOREIGN PATENT DOCUMENTS

| | | |
|---|---|---|
| CN | 1696913 A | 11/2005 |
| CN | 104937574 A | 9/2015 |
| CN | 106570086 A | 4/2017 |

OTHER PUBLICATIONS

Non-Final Office Action from U.S. Appl. No. 16/258,211, dated Apr. 8, 2020.

(Continued)

*Primary Examiner* — Hua J Song
(74) *Attorney, Agent, or Firm* — Zilka-Kotab, P.C.

(57) ABSTRACT

A computer-implemented method according to one embodiment includes identifying a request to migrate data associated with a volume from a source storage pool that has a first rank extent size to a destination storage pool that has a second rank extent size greater than the first rank extent size. Additionally, the method includes creating a correspondence between logical volume extents of the volume and physical offset locations within rank extents of the destination storage pool. Further, the method includes migrating data from one or more ranks of the source storage pool to one or more ranks of the destination storage pool, according to the correspondence between the logical volume extents of the volume and the physical offset locations within the rank extents of the destination storage pool.

25 Claims, 9 Drawing Sheets

(56) References Cited

U.S. PATENT DOCUMENTS

| | | | |
|---|---|---|---|
| 2012/0036327 A1 | 2/2012 | Jennas, II et al. | |
| 2012/0221684 A1* | 8/2012 | Ferris | H04L 67/28 709/218 |
| 2012/0303739 A1* | 11/2012 | Ferris | H04L 69/329 709/217 |
| 2013/0073825 A1 | 3/2013 | Terayama et al. | |
| 2015/0032961 A1* | 1/2015 | Sanford | G06F 16/119 711/118 |
| 2017/0185314 A1 | 6/2017 | Gensler, Jr. et al. | |
| 2020/0065392 A1* | 2/2020 | Shuma | G06F 16/214 |
| 2020/0241787 A1 | 7/2020 | Zhang et al. | |

OTHER PUBLICATIONS

Zhang et al., U.S. Appl. No. 16/258,211, filed Jan. 25, 2019.
List of IBM Patents or Patent Applications Treated as Related.
Restriction Requirement from U.S. Appl. No. 16/258,211, dated Jan. 28, 2020.
IBM, "SVC Volume Migration," IBM White paper, 2004, pp. 1-52.
Anonymous, "Reducing Memory Management Activity in a Virtual Machine through the use of Internal Object Pools," IP.com Prior Art Database Technical Disclosure, No. IPCOM000251646D, Nov. 21, 2017, pp. 1-7.
Anonymous, "System and Method to provision & share storage across Shared Storage Pool Tiers," IP.com Prior Art Database Technical Disclosure, No. IPCOM000240358D, Jan. 26, 2015, pp. 1-5.
Anonymous, "Method and System for Providing Virtual Defragmentation of Extremely Large Volumes," IP.com Prior Art Database Technical Disclosure, No. IPCOM000235456D, Feb. 28, 2014, pp. 1-3.
Anonymous, "Method for enhanced application performance and improved load balancing considerations in multi-tier storage environment," IP.com Prior Art Database Technical Disclosure, No. IPCOM000250728D, Aug. 29, 2017, pp. 1-7.
Hardy et al., U.S. Appl. No. 16/563,109, filed Sep. 6, 2019.
Hardy et al., U.S. Appl. No. 16/563,072, filed Sep. 6, 2019.
Notice of Allowance from U.S. Appl. No. 16/258,211, dated Aug. 6, 2020.
Final Office Action from U.S. Appl. No. 16/258,211, dated Jun. 24, 2020.
International Search Report and Written Opinion from PCT Application No. PCT/IB2020/050435, dated Jun. 15, 2020.

* cited by examiner

MIGRATING DATA FROM A SMALL EXTENT POOL TO A LARGE EXTENT POOL

BACKGROUND

The present invention relates to data migration, and more specifically, this invention relates to migrating data from a first extent pool to a second extent pool with a larger granularity than the first extent pool.

Extent pools in storage products may have different extent sizes. For example, a 1 GB extent size may be implemented for a large extent pool and a 16 MB extent size may be implemented for a small extent pool. Some workloads may perform better in a large extent pool when compared to a small extent pool. However, current methods to transfer data are expensive, and involve using a host to copy the data or implementing a flash copy. There is therefore a need to efficiently migrate volumes from small extent pools to large extent pools.

SUMMARY

A computer-implemented method according to one embodiment includes identifying a request to migrate data associated with a volume from a source storage pool that has a first rank extent size to a destination storage pool that has a second rank extent size greater than the first rank extent size. Additionally, the method includes creating a correspondence between logical volume extents of the volume and physical offset locations within rank extents of the destination storage pool. Further, the method includes migrating data from one or more ranks of the source storage pool to one or more ranks of the destination storage pool, according to the correspondence between the logical volume extents of the volume and the physical offset locations within the rank extents of the destination storage pool.

In this way, data is migrated from a source storage pool to a destination storage pool having a rank extent size larger than the rank extent size of the source storage pool without having to use a host to copy the data or implement a flash copy. This reduces an amount of time and resources of one or more systems performing the data migration, which improves a performance of the one or more systems.

In one optional embodiment, creating the correspondence includes populating empty volume extents of the volume with corresponding offset locations within one or more allocated rank extents within the destination storage pool. In this way, empty entries within a volume may be populated such that an organization of entries within a small VST matches an organization of offset locations within an allocated rank extent corresponding to the small VST.

According to another embodiment, a computer program product for migrating data from a small extent pool to a large extent pool includes a computer readable storage medium having program instructions. Additionally, the computer readable storage medium is not a transitory signal per se. Further, the program instructions are executable by a processor to cause the processor to perform a method. Further still, the method includes identifying, utilizing the processor, a request to migrate data associated with a volume from a source storage pool that has a first rank extent size to a destination storage pool that has a second rank extent size greater than the first rank extent size. Further still, the method includes creating, utilizing the processor, a correspondence between logical volume extents of the volume and physical offset locations within rank extents of the destination storage pool. Also, the method includes migrating, utilizing the processor, data from one or more ranks of the source storage pool to one or more ranks of the destination storage pool, according to the correspondence between the logical volume extents of the volume and the physical offset locations within the rank extents of the destination storage pool.

A system according to another embodiment includes a processor, and logic integrated with the processor, executable by the processor, or integrated with and executable by the processor. Additionally, the logic is configured to identify a request to migrate data associated with a volume from a source storage pool that has a first rank extent size to a destination storage pool that has a second rank extent size greater than the first rank extent size. Further, the logic is configured to create a correspondence between logical volume extents of the volume and physical offset locations within rank extents of the destination storage pool. Further still, the logic is configured to migrate data from one or more ranks of the source storage pool to one or more ranks of the destination storage pool, according to the correspondence between the logical volume extents of the volume and the physical offset locations within the rank extents of the destination storage pool.

A computer-implemented method according to another embodiment includes identifying a request to migrate data associated with a volume from a source storage pool to a destination storage pool. Additionally, the method includes allocating one or more rank extents within the destination storage pool. Further, the method includes populating empty volume extents of the volume with corresponding offset locations within the allocated one or more rank extents within the destination storage pool. Further still, the method includes marking previously unallocated volume extents to be initialized within the volume. Also, the method includes marking offset locations to be initialized within the allocated one or more rank extents, where the marked offset locations correspond to the previously unallocated volume extents within the volume. Also, the method includes transferring the data associated with the volume from one or more rank extents within the source storage pool to one or more offset locations within the allocated one or more rank extents of the destination storage pool. Furthermore, the method includes adjusting volume extents within the volume to point to the one or more offset locations within the allocated one or more rank extents of the destination storage pool that store the transferred data. In addition, the method includes freeing the data from the one or more rank extents within the source storage pool. Further still, the method includes reducing a representation of the volume extents within the volume.

In this way, data is migrated from a source storage pool to a destination storage pool having a rank extent size larger than the rank extent size of the source storage pool. This may improve a performance of applications accessing the data in the destination storage pool, as the applications may perform better when utilizing larger rank extents.

According to another embodiment, a computer program product for migrating data from a small extent pool to a large extent pool includes a computer readable storage medium that has program instructions. Additionally, the computer readable storage medium is not a transitory signal per se. Further, the program instructions are executable by a processor to cause the processor to perform a method. Further still, the method includes identifying, utilizing the processor, a request to migrate data associated with a volume from a source storage pool to a destination storage pool. Also, the method includes allocating, utilizing the processor, one or more rank extents within the destination storage pool. In addition, the method includes populating, utilizing the processor, empty volume extents of the volume with corresponding offset locations within the allocated one or more rank extents within the destination storage pool. Furthermore, the method includes marking, utilizing the processor, previously unallocated volume extents to be initialized within the volume. Further still, the method includes marking, utilizing the processor, offset locations to be initialized within the allocated one or more rank extents, where the marked offset locations correspond to the previously unallocated volume extents within the volume. Also, the method includes transferring, utilizing the processor, the data associated with the volume from one or more rank extents within the source storage pool to one or more offset locations within the allocated one or more rank extents of the destination storage pool. Further, the method includes adjusting, utilizing the processor, volume extents within the volume to point to the one or more offset locations within the allocated one or more rank extents of the destination storage pool that store the transferred data. Additionally, the method includes freeing, utilizing the processor, the data from the one or more rank extents within the source storage pool. Further still, the method includes reducing, utilizing the processor, a representation of the volume extents within the volume.

Other aspects and embodiments of the present invention will become apparent from the following detailed description, which, when taken in conjunction with the drawings, illustrate by way of example the principles of the invention.

DETAILED DESCRIPTION

Figure 1:
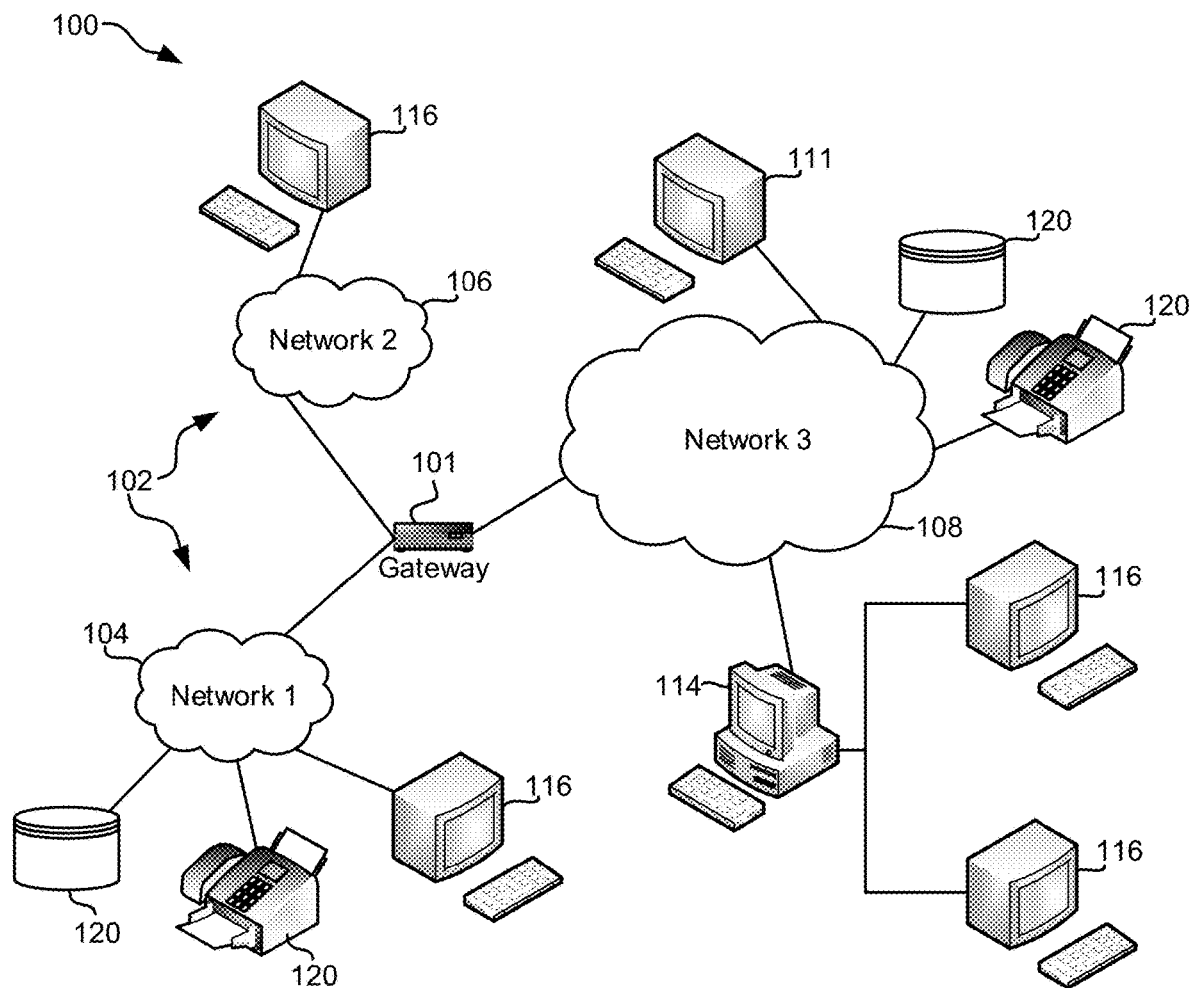
FIG. 1 illustrates a network architecture, in accordance with one embodiment.

The following description discloses several preferred embodiments of systems, methods and computer program products for migrating data from a small extent pool to a large extent pool. Various embodiments provide a method to create a correspondence between logical volume extents of the volume and physical offset locations within rank extents of the destination storage pool, and migrate data from one or more ranks of the source storage pool to one or more ranks of the destination storage pool, according to the correspondence.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for migrating data from a small extent pool to a large extent pool.

In one general embodiment, a computer-implemented method includes identifying a request to migrate data associated with a volume from a source storage pool that has a first rank extent size to a destination storage pool that has a second rank extent size greater than the first rank extent size. Additionally, the method includes creating a correspondence between logical volume extents of the volume and physical offset locations within rank extents of the destination storage pool. Further, the method includes migrating data from one or more ranks of the source storage pool to one or more ranks of the destination storage pool, according to the correspondence between the logical volume extents of the volume and the physical offset locations within the rank extents of the destination storage pool.

In this way, data is migrated from a source storage pool to a destination storage pool having a rank extent size larger than the rank extent size of the source storage pool without having to use a host to copy the data or implement a flash copy. This reduces an amount of time and resources of one or more systems performing the data migration, which improves a performance of the one or more systems.

In one optional embodiment, creating the correspondence includes populating empty volume extents of the volume with corresponding offset locations within one or more allocated rank extents within the destination storage pool. In this way, empty entries within a volume may be populated such that an organization of entries within a small VST matches an organization of offset locations within an allocated rank extent corresponding to the small VST.

In another general embodiment, a computer program product for migrating data from a small extent pool to a large extent pool includes a computer readable storage medium having program instructions. Additionally, the computer readable storage medium is not a transitory signal per se. Further, the program instructions are executable by a processor to cause the processor to perform a method. Further still, the method includes identifying, utilizing the processor, a request to migrate data associated with a volume from a source storage pool that has a first rank extent size to a destination storage pool that has a second rank extent size greater than the first rank extent size. Further still, the method includes creating, utilizing the processor, a correspondence between logical volume extents of the volume and physical offset locations within rank extents of the destination storage pool. Also, the method includes migrating, utilizing the processor, data from one or more ranks of the source storage pool to one or more ranks of the destination storage pool, according to the correspondence between the logical volume extents of the volume and the physical offset locations within the rank extents of the destination storage pool.

In another general embodiment, a system includes a processor, and logic integrated with the processor, executable by the processor, or integrated with and executable by the processor. Additionally, the logic is configured to identify a request to migrate data associated with a volume from a source storage pool that has a first rank extent size to a destination storage pool that has a second rank extent size greater than the first rank extent size. Further, the logic is configured to create a correspondence between logical volume extents of the volume and physical offset locations within rank extents of the destination storage pool. Further still, the logic is configured to migrate data from one or more ranks of the source storage pool to one or more ranks of the destination storage pool, according to the correspondence between the logical volume extents of the volume and the physical offset locations within the rank extents of the destination storage pool.

In another general embodiment, a computer-implemented method includes identifying a request to migrate data associated with a volume from a source storage pool to a destination storage pool. Additionally, the method includes allocating one or more rank extents within the destination storage pool. Further, the method includes populating empty volume extents of the volume with corresponding offset locations within the allocated one or more rank extents within the destination storage pool. Further still, the method includes marking previously unallocated volume extents to be initialized within the volume. Also, the method includes marking offset locations to be initialized within the allocated one or more rank extents, where the marked offset locations correspond to the previously unallocated volume extents within the volume. Also, the method includes transferring the data associated with the volume from one or more rank extents within the source storage pool to one or more offset locations within the allocated one or more rank extents of the destination storage pool. Furthermore, the method includes adjusting volume extents within the volume to point to the one or more offset locations within the allocated one or more rank extents of the destination storage pool that store the transferred data. In addition, the method includes freeing the data from the one or more rank extents within the source storage pool. Further still, the method includes reducing a representation of the volume extents within the volume.

In this way, data is migrated from a source storage pool to a destination storage pool having a rank extent size larger than the rank extent size of the source storage pool. This may improve a performance of applications accessing the data in the destination storage pool, as the applications may perform better when utilizing larger rank extents.

In another general embodiment, a computer program product for migrating data from a small extent pool to a large extent pool includes a computer readable storage medium that has program instructions. Additionally, the computer readable storage medium is not a transitory signal per se. Further, the program instructions are executable by a processor to cause the processor to perform a method. Further still, the method includes identifying, utilizing the processor, a request to migrate data associated with a volume from a source storage pool to a destination storage pool. Also, the method includes allocating, utilizing the processor, one or more rank extents within the destination storage pool. In addition, the method includes populating, utilizing the processor, empty volume extents of the volume with corresponding offset locations within the allocated one or more rank extents within the destination storage pool. Furthermore, the method includes marking, utilizing the processor, previously unallocated volume extents to be initialized within the volume. Further still, the method includes marking, utilizing the processor, offset locations to be initialized within the allocated one or more rank extents, where the marked offset locations correspond to the previously unallocated volume extents within the volume. Also, the method includes transferring, utilizing the processor, the data associated with the volume from one or more rank extents within the source storage pool to one or more offset locations within the allocated one or more rank extents of the destination storage pool. Further, the method includes adjusting, utilizing the processor, volume extents within the volume to point to the one or more offset locations within the allocated one or more rank extents of the destination storage pool that store the transferred data. Additionally, the method includes freeing, utilizing the processor, the data from the one or more rank extents within the source storage pool. Further still, the method includes reducing, utilizing the processor, a representation of the volume extents within the volume.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
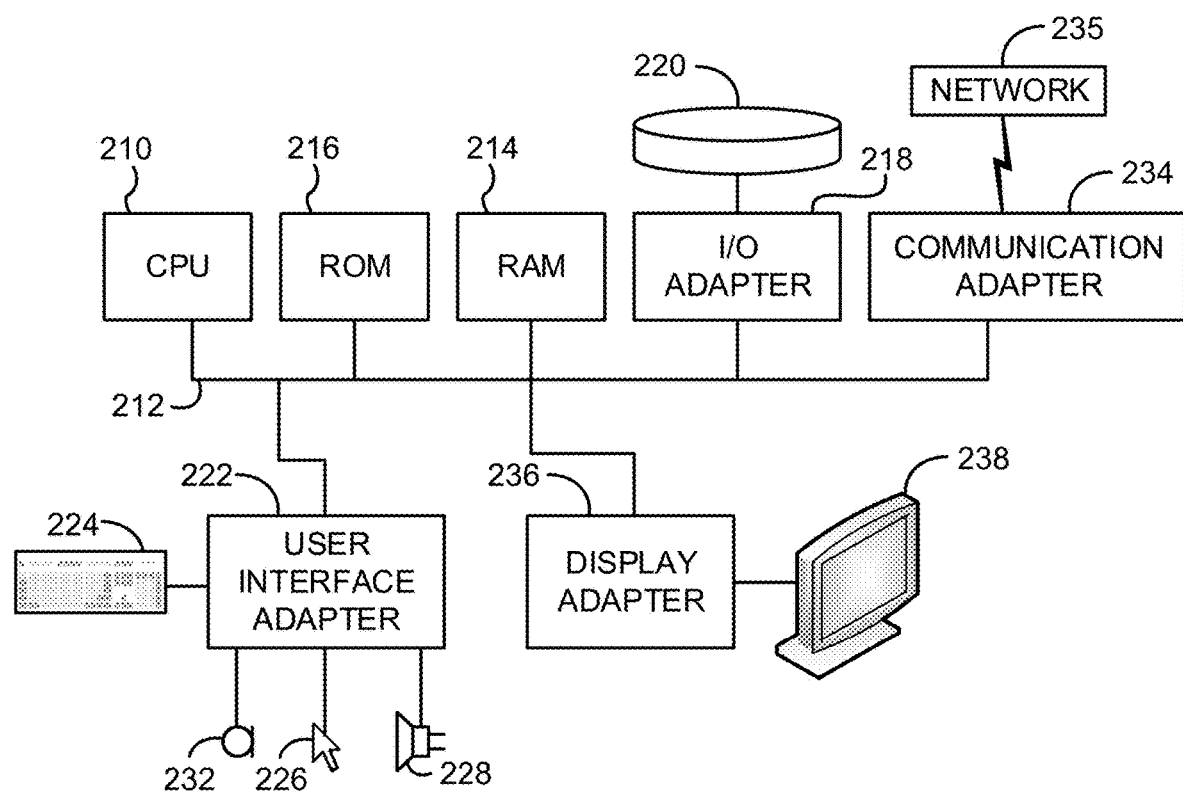
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
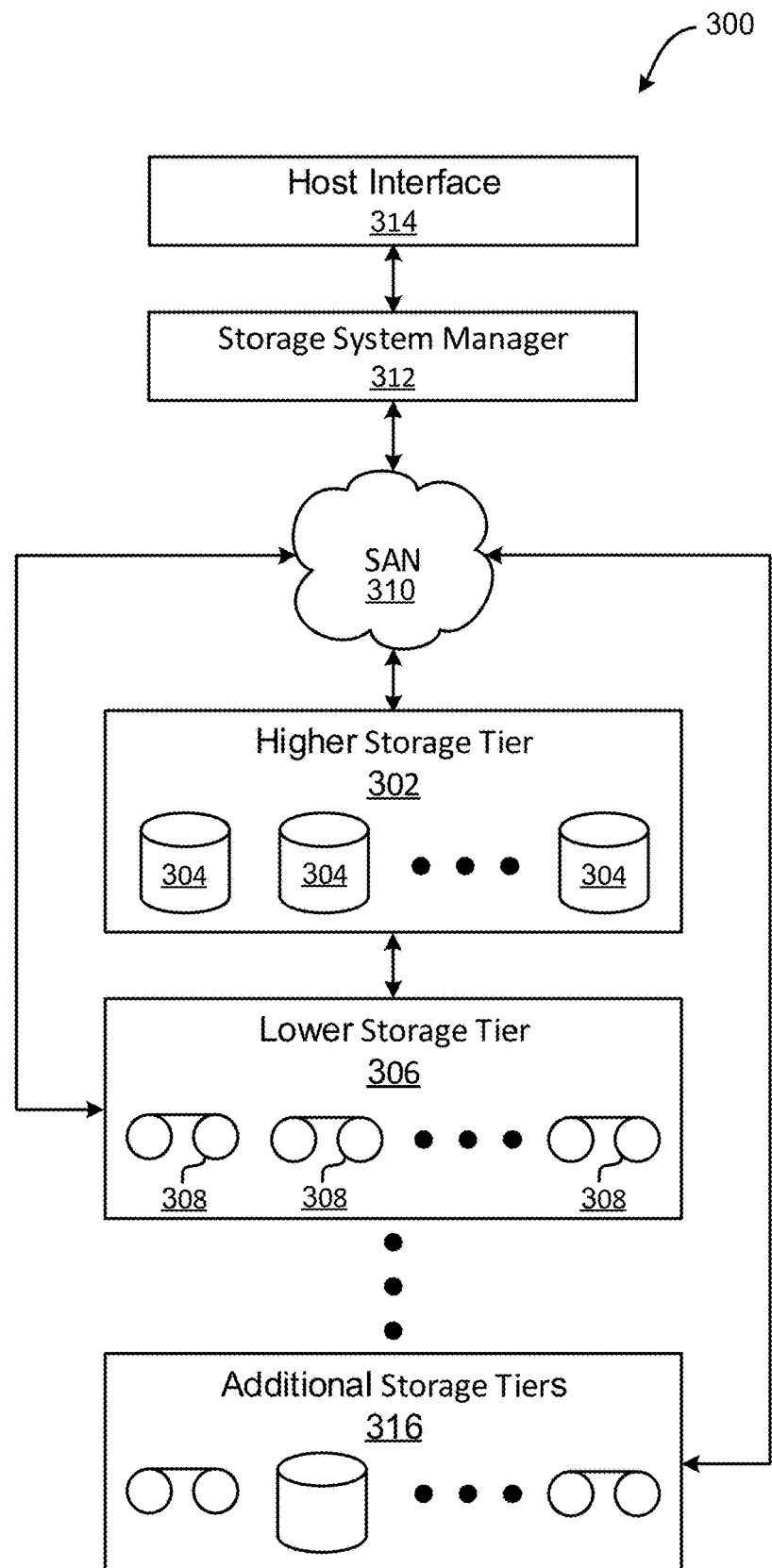
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
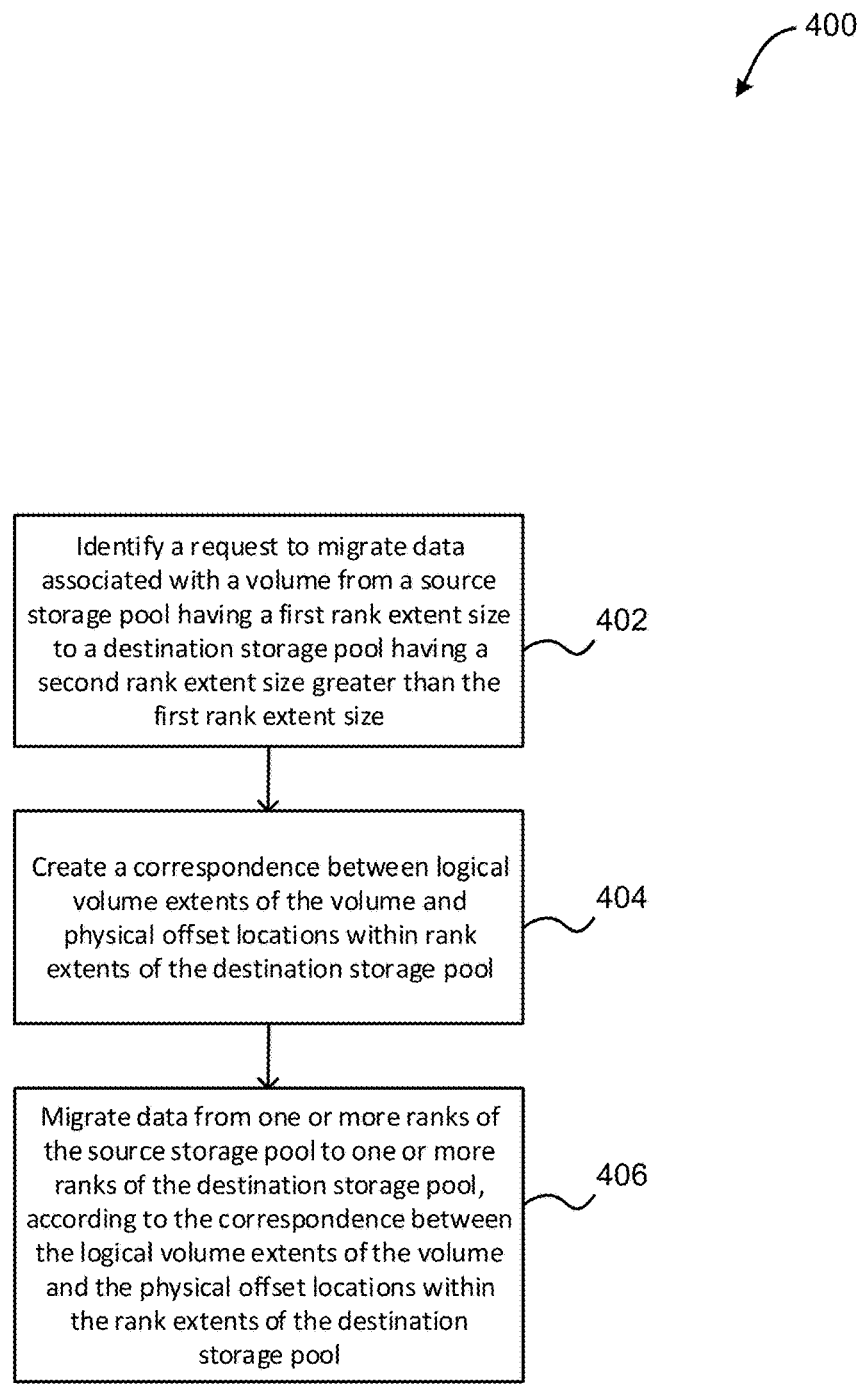
FIG. 4 illustrates a method for migrating data from a small extent pool to a large extent pool, in accordance with one embodiment.

Now referring to FIG. 4, a flowchart of a method 400 is shown according to one embodiment. The method 400 may be performed in accordance with the present invention in any of the environments depicted in FIGS. 1-3 and 6A-D, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received to migrate data associated with a volume from a source storage pool having a first rank extent size to a destination storage pool having a second rank extent size greater than the first rank extent size.

Additionally, method 400 may proceed with operation 404, where a correspondence is created between logical volume extents of the volume and physical offset locations within rank extents of the destination storage pool. In one embodiment, creating the correspondence includes allocating one or more rank extents within the destination storage pool. In another embodiment, creating the correspondence includes populating empty volume extents of the volume with corresponding offset locations within the allocated one or more rank extents within the destination storage pool.

Further, in one embodiment, creating the correspondence includes marking previously unallocated volume extents to be initialized within the volume. In another embodiment, creating the correspondence includes marking offset locations to be initialized within the allocated one or more rank extents, where the offset locations correspond to the previously unallocated volume extents within the volume.

Further still, method 400 may proceed with operation 406, where data is migrated from one or more ranks of the source storage pool to one or more ranks of the destination storage pool, according to the correspondence between the logical volume extents of the volume and the physical offset locations within the rank extents of the destination storage pool. In one embodiment, migrating the data may include transferring the data associated with the volume from one or more rank extents within the source storage pool to one or more offset locations within the allocated one or more rank extents of the destination storage pool.

Also, in one embodiment, migrating the data includes freeing the data from the one or more rank extents within the source storage pool. In another embodiment, migrating the data includes adjusting the volume extents within the volume to point to the one or more offset locations within the allocated one or more rank extents of the destination storage pool that store the transferred data. In yet another embodiment, a representation of the volume extents is reduced within the volume.

In this way, data is migrated from a source storage pool to a destination storage pool having a rank extent size larger than the rank extent size of the source storage pool without having to use a host to copy the data or implement a flash copy. This reduces an amount of time and resources of one or more systems performing the data migration, which improves a performance of the one or more systems.

Figure 5:
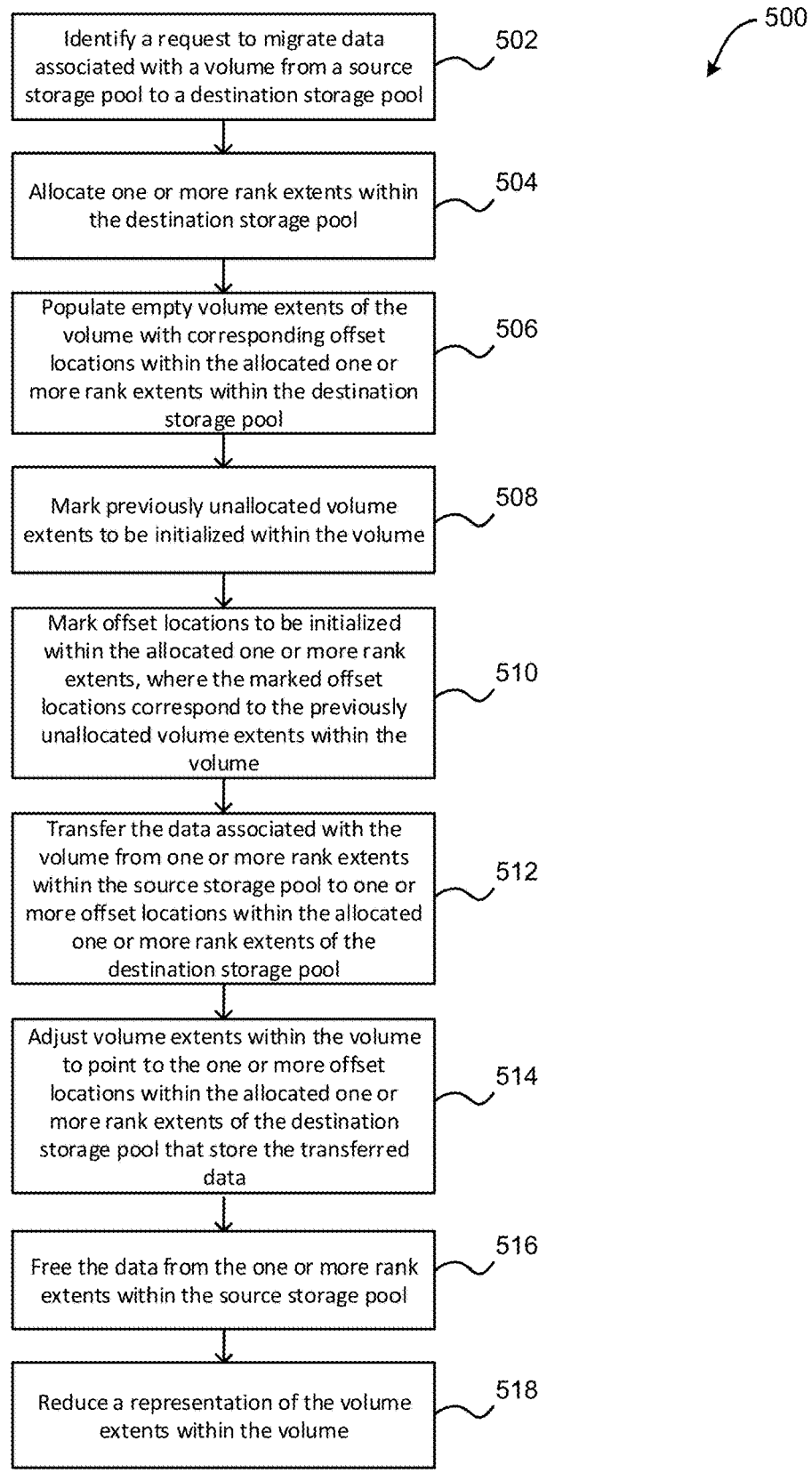
FIG. 5 illustrates a method for migrating data from a source storage pool to a destination storage pool having a larger extent granularity than the source pool, in accordance with one embodiment.

Now referring to FIG. 5, a flowchart of a method 500 for migrating data from a source storage pool to a destination storage pool having a larger extent granularity than the source pool is identified is shown according to one embodiment. The method 500 may be performed in accordance with the present invention in any of the environments depicted in FIGS. 1-3 and 6A-D, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to migrate data associated with a volume from a source storage pool to a destination storage pool is identified. In one embodiment, the volume includes a storage volume that organizes and presents a logical representation of the data in a contiguous manner to one or more hosts. In another embodiment, the volume includes a plurality of volume extents. For example, each volume extent may include a logical extent.

Additionally, in one embodiment, the volume extents are grouped within entries of a volume segment table (VST), where each volume extent is either full or empty. For example, in one embodiment, full volume extents include a physical location of data within the source storage pool (e.g., an identification of a rank and a rank extent within that rank where the data associated with the volume extent is stored). In another example, each entry of a VST includes a predetermined number of consecutive volume extents. In yet another example, the VST maps the logical extents of the volume (e.g., the volume extents) to physical extents of one or more ranks within a storage pool (e.g., rank extents).

Further, in one embodiment, a small VST represents and manages the entries of the VST with a higher granularity. For example, each entry of the VST includes a grouped plurality of volume extents identified only by a VST entry number. In another example, a single VST entry is represented by a small VST having entries corresponding to each of the plurality of volume extents grouped within the single VST entry.

Further still, in one embodiment, a storage pool includes one or more ranks. In another embodiment, each rank includes a redundant amount of storage (e.g., a RAID storage array, etc.). In yet another embodiment, data logically represented in the volume is physically stored in one or more ranks of a storage pool. For example, in one embodiment, each rank includes a plurality of rank extents.

Also, in one embodiment, the extents within a rank are represented as entries within a rank segment table (RST) for the rank, where each rank extent is either full or empty. For example, each rank extent represents a physical extent. In another example, each rank extent represents a predetermined amount of storage for storing data within the storage pool. In yet another example, full rank extents include a logical location of data within the volume (e.g., an identification of a volume and a volume extent within that volume where the data is logically stored and presented to one or more hosts).

In addition, in one embodiment, the source storage pool includes one or more ranks that initially store all data logically represented in the volume. In another embodiment, the data logically represented in the volume is physically stored in multiple ranks within the source storage pool.

Furthermore, in one embodiment, the source storage pool has a first rank extent size, and the destination storage pool has a second rank extent size larger than the first rank extent size. For example, the source storage pool may have rank extents with a size of 16 MB, and the second extent pool may have rank extents with a size of 1 GB.

Further still, method 500 may proceed with operation 504, where one or more rank extents are allocated within the destination storage pool. In one embodiment, a number of rank extents allocated within the destination storage pool corresponds to a size of the volume. For example, a total size of data logically represented by the volume is allocated within the destination storage pool. In another example, the total size of the data logically represented by the volume is divided by a rank extent size of the destination storage pool to determine a number of rank extents that are allocated within the storage pool. In another embodiment, the one or more rank extents are allocated serially or non-serially.

Also, method 500 may proceed with operation 506, where empty volume extents of the volume are populated with corresponding offset locations within the allocated one or more rank extents within the destination storage pool. In one embodiment, the empty volume extents include volume extents that do not include a logical representation of data stored in the source storage pool. In another embodiment, the offset locations of a rank extent represent a logical rank extent number within a logical representation of the rank extent (e.g., that indicates a predetermined portion of the rank extent). For example, a rank extent of size 1 GB may have a plurality of offset locations that each represent 16 MB portions of the rank extent (such that a single 1 GB rank extent would have sixty-four 16 MB offset locations, etc.). This allows for a representation of a rank extent at a higher granularity.

Additionally, in one embodiment, each empty VST entry (e.g., volume extent) within the volume corresponds to an allocated rank extent within the destination storage pool. In another embodiment, each empty VST entry (e.g., volume extent) is represented within a small VST. For example, the small VST includes a number of volume extents that match a number of offset locations within a corresponding rank extent within the destination storage pool.

Further, in one embodiment, an empty volume extent at a predetermined location within a small VST is populated with an offset location within a corresponding rank extent that matches the predetermined location within the small VST. In this way, the empty entries within the volume are populated such that an organization (e.g., order, numbering, etc.) of entries within a small VST matches an organization of offset locations within an allocated rank extent corresponding to the small VST.

Further still, method 500 may proceed with operation 508, where previously unallocated volume extents are marked to be initialized within the volume. In one embodiment, the previously unallocated volume extents include volume extents that were empty prior to the request to migrate data (e.g., the empty volume extents that were populated with corresponding offset locations within the allocated one or more rank extents within the destination storage pool).

Also, method 500 may proceed with operation 510, where offset locations are marked to be initialized within the allocated one or more rank extents, where the marked offset locations correspond to the previously unallocated volume extents within the volume. In one embodiment, the offset locations that correspond to the previously unallocated volume extents are identified, and the identified offset locations are marked as needing to be initialized.

In addition, method 500 may proceed with operation 512, where the data associated with the volume is transferred from one or more rank extents within the source storage pool to one or more offset locations within the allocated one or more rank extents of the destination storage pool. In one embodiment, transferring the data includes identifying a location of all previously allocated volume extents within the volume. For example, the previously allocated volume extents include volume extents that contain a logical representation of data physically stored in the source storage pool. In another example, the previously allocated volume extents include volume extents that were filled with a logical representation of the data prior to the request to migrate the data (e.g., the full volume extents that contain an identification of a rank extent within one or more RSTs of the source storage pool prior to the request to migrate the data).

Furthermore, in one embodiment, transferring the data includes determining a location of all rank extents within one or more RSTs of the source storage pool that correspond to all previously allocated volume extents within the volume. In another embodiment, transferring the data includes determining all offset locations within the allocated one or more rank extents within the destination storage pool that match all previously allocated volume extents within the volume.

Further still, in one embodiment, transferring the data includes transferring the data stored in the one or more rank extents within the source storage pool to the corresponding one or more offset locations within the allocated one or more rank extents within the destination storage pool. For example, data stored in a rank extent of a rank of the source storage pool that corresponds to a predetermined volume extent in the volume is transferred to an offset location of an allocated rank extent of the destination storage pool that matches a location of the predetermined volume extent in the volume.

Also, method 500 may proceed with operation 514, where the volume extents are adjusted within the volume to point to the one or more offset locations within the allocated one or more rank extents of the destination storage pool that store the transferred data. In one embodiment, all previously allocated volume extents within the volume are changed to identify the location of the corresponding migrated data within the destination storage pool instead of the source storage pool.

Additionally, method 500 may proceed with operation 516, where the data is freed from the one or more rank extents within the source storage pool. In one embodiment, the data is deleted from the one or more rank extents within the source storage pool.

For example, a previously allocated volume extent originally identifies a rank extent in the source storage pool where the data logically represented by that volume extent is physically stored. In another example, the previously allocated volume extent is updated to identify the offset location within the allocated rank extent of the destination storage pool where the data associated with the previously allocated volume extent was migrated. In yet another example, the stored data is migrated from the rank extent in the source storage pool to an offset location within an allocated rank extent of the destination storage pool.

In this way, an order of volume extents within the VSTs of the volume matches an ordering of offsets within a logical representation of the allocated rank extent where data associated with those volume extents is stored. For example, a location of a volume extent within a VST of the volume matches an offset within an allocated rank extent corresponding to the VST, where data for the entry is stored at the offset. This simplifies and expedites data recall within the destination storage pool.

Further, method 500 may proceed with operation 518, where a representation of the volume extents is reduced within the volume. In one embodiment, all small VSTs are removed that represent the entries of the VST with a higher granularity. In another embodiment, the entries in the VST are updated to point to corresponding rank extents within the destination storage pool. For example, if all volume extents of a small VST representation of a single VST entry correspond/refer to all offset locations of a single assigned rank extent of the destination storage pool, the small VST is eliminated, and the single VST entry is updated to correspond/refer to the single assigned rank extent of the destination storage pool.

In one embodiment, one or more applications are provided access to the data at the destination storage pool. For example, one or more applications running on one or more hosts may send one or more data requests to the volume, and the volume may direct the data requests to the destination storage pool to implement data access. In another embodiment, the one or more applications may run more efficiently when accessing data using the larger rank extent granularity within the destination storage pool compared to the smaller rank extent granularity within the source storage pool.

In this way, data is migrated from a source storage pool to a destination storage pool having a rank extent size larger than the rank extent size of the source storage pool. This may improve a performance of applications accessing the data in the destination storage pool, as the applications may perform better when utilizing larger rank extents.

Figure 6A:
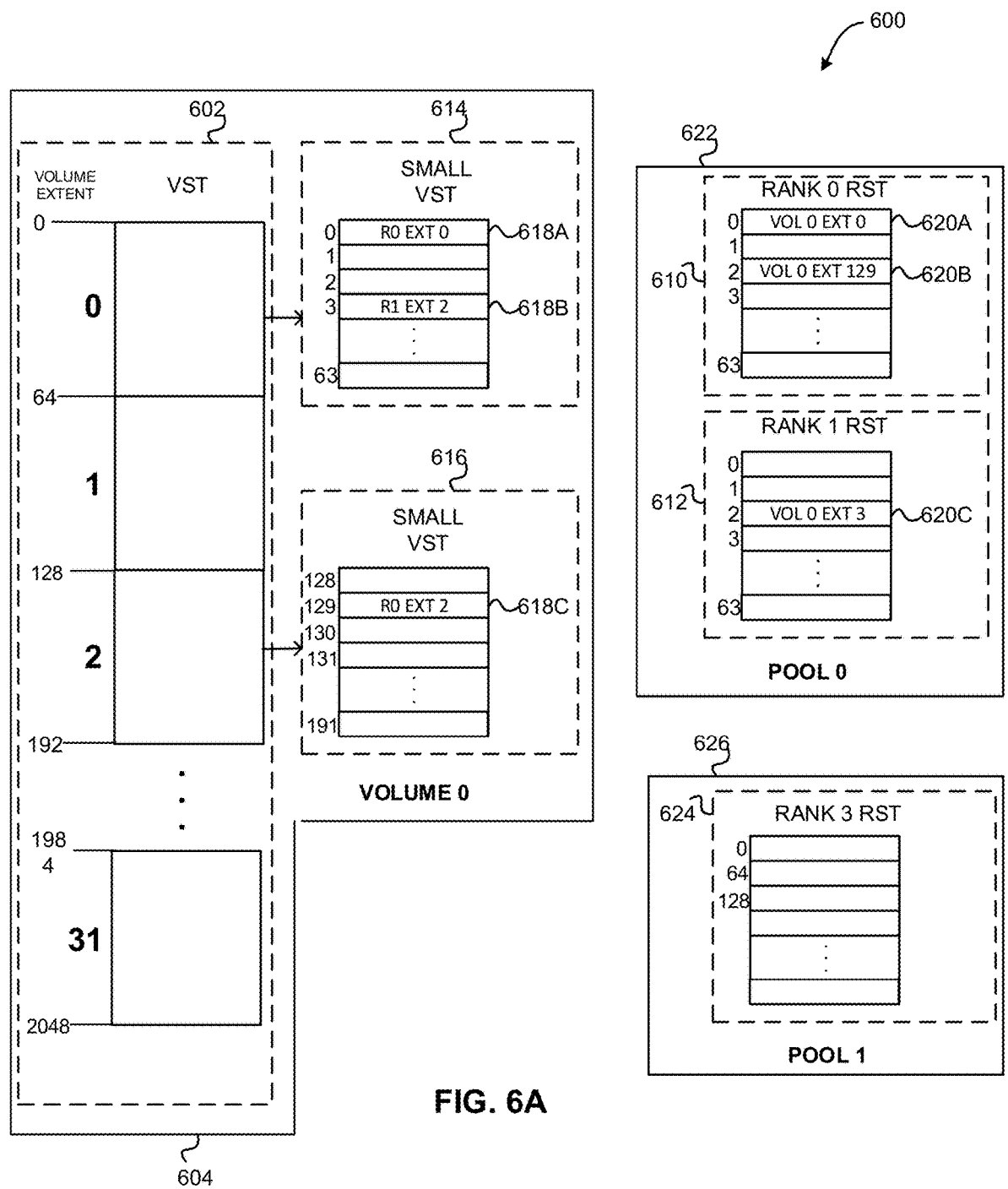
FIG. 6A illustrates an exemplary storage environment prior to a data migration, in accordance with one embodiment.

FIG. 6A illustrates an exemplary storage environment 600 prior to a data migration, according to one embodiment. As shown, a VST 602 stores a logical representation of data stored within a volume 0 604, where small VSTs 614 and 616 are used to represent the volume extents within VST entry 0 632 and VST entry 2 634, respectively. Additionally, RSTs store a physical representation of the data as stored within a rank 0 610 and a rank 1 612 of a source pool 0 622. Also, the rank granularity of source pool 0 622 is 16 MB. For example, each rank extent within source pool 0 622 has a size of 16 MB.

Further, full volume extents 618A-C refer to locations 620A-C within the RSTs where data is physically stored within source pool 0 622. For example, rank extent 0 620A for rank 0 610 of source pool 0 622 includes a link to volume extent 0 618A within volume 0 604. Conversely, volume extent 0 618A within volume 0 604 includes a link to rank extent 0 620A for rank 0 610 of source pool 0 622.

Likewise, rank extent 2 620B for rank 0 610 of source pool 0 622 includes a link to volume extent 129 618C within volume 0 604. Conversely, volume extent 129 618C within volume 0 604 includes a link to rank extent 2 620B for rank 0 610 of source pool 0 622. Further still, rank extent 2 620C for rank 1 612 of source pool 0 622 includes a link to volume extent 3 618B within volume 0 604. Conversely, volume extent 3 618B within volume 0 604 includes a link to rank extent 2 620B for rank 1 612 of source pool 0 622.

In this way, a connection between a logical representation of data in volume 0 604 is mapped to a physical representation of data in source pool 0 622.

Figure 6B:
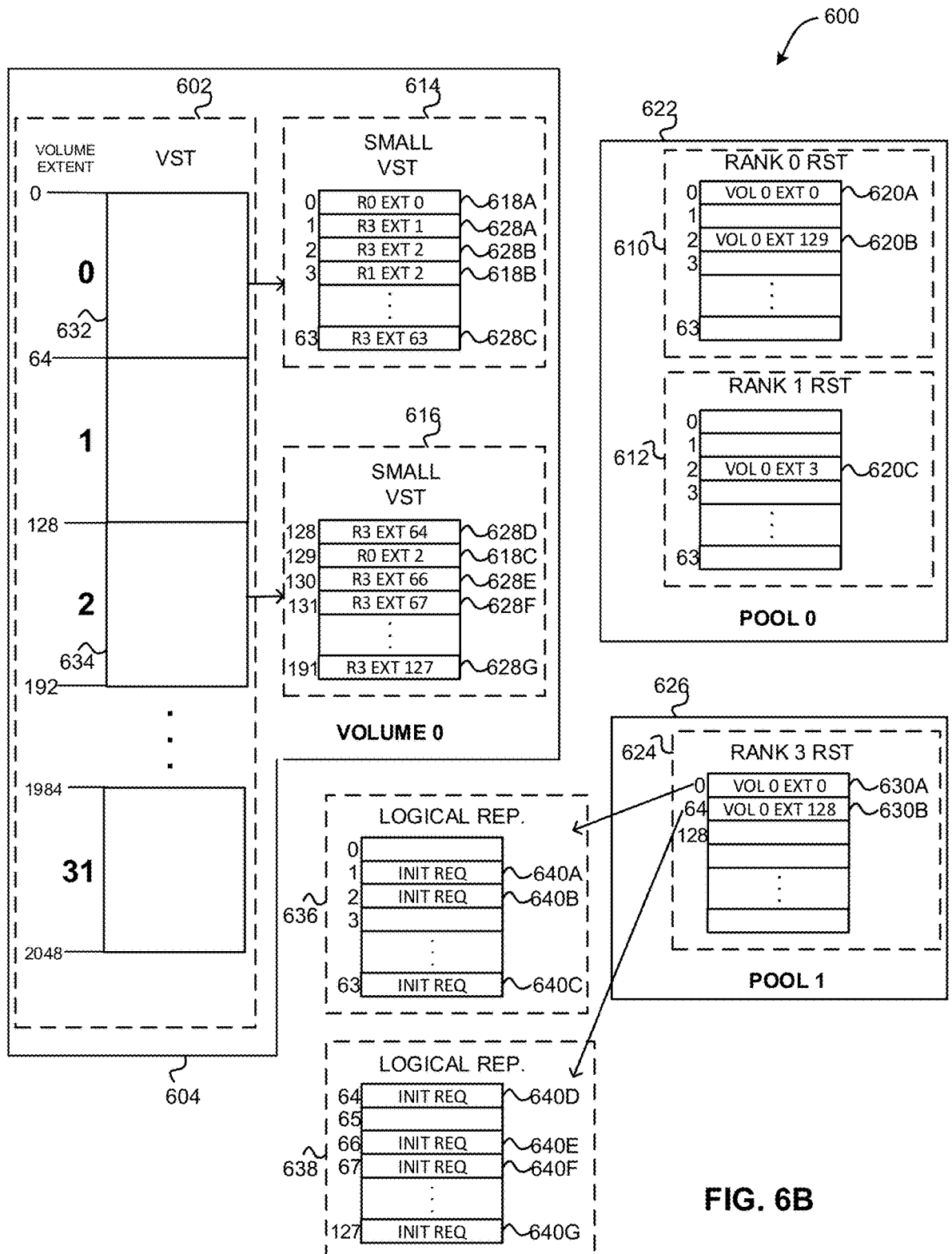
FIG. 6B illustrates an exemplary storage environment during an initialization stage in response to a migration request, in accordance with one embodiment.

FIG. 6B illustrates an exemplary storage environment 600 during an initialization stage in response to a migration request, according to one embodiment. The rank granularity of a destination pool 1 626 is 1 GB. For example, each rank extent within the destination pool 1 626 has a size of 1 GB. Since the rank granularity of the source pool 0 622 is 16 MB, the destination pool 1 626 has a greater rank granularity than the source pool 0 622.

In one embodiment, a request is received to migrate data from source pool 0 622 to destination pool 1 626. In another embodiment, in response to the migration request, allocated rank extents 630A and 630B are allocated within the destination rank 3 624 in the destination pool 1 626. It should be noted that although the allocated rank extents 630A and 630B are serial, allocation may not need to be performed serially. Logical representations 636 and 638 of offset locations 640A-G of allocated rank extents 630A and 630B are also shown. In yet another embodiment, allocated rank extents 630A and 630B are updated to link to corresponding VST entries 632 and 634 in volume 0 604.

Additionally, in one embodiment, in response to the migration request, empty volume extents 628A-G are populated with corresponding offset locations within the allocated rank extents 630A and 630B. Further, in one embodiment, these previously unallocated volume extents 628A-G are marked to be initialized within volume 0 604.

Further, in one embodiment, offset locations 640A-G of allocated rank extents 630A and 630B that correspond to previously unallocated volume extents 628A-G are marked to be initialized.

In this way, a correspondence may be created between volume 0 604 and a destination rank 3 624 in the destination pool 1 626.

Figure 6C:
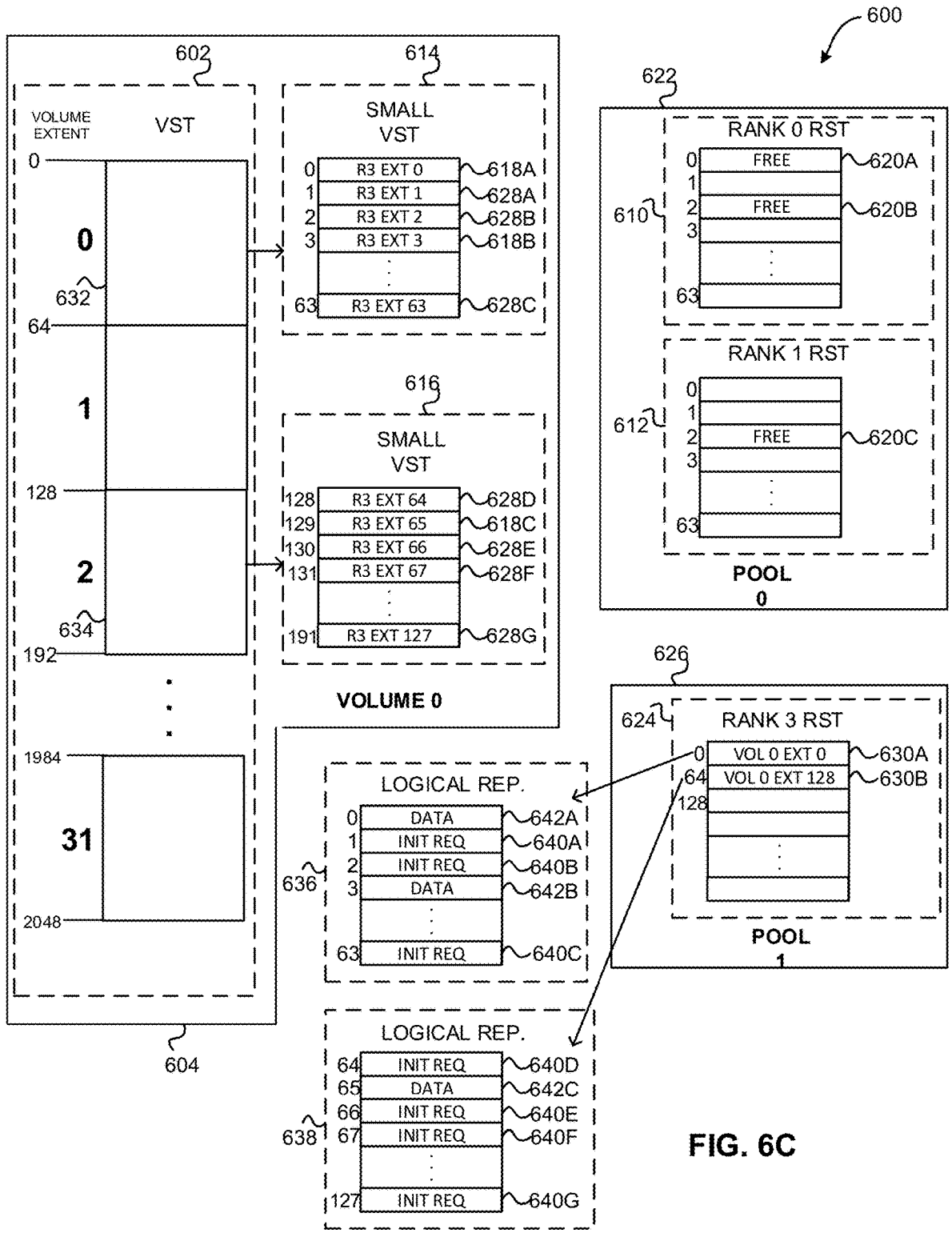
FIG. 6C illustrates an exemplary storage environment after a data migration from a source pool to a destination pool, in accordance with one embodiment.

FIG. 6C illustrates an exemplary storage environment 600 after a data migration from a source pool 0 622 to a destination pool 1 626, according to one embodiment. As shown, data physically stored in locations 620A-C within the source pool 0 622 is transferred to corresponding offset locations 642A-C within the destination pool 1 626. More specifically, data physically stored in location 620A is transferred to corresponding offset location 642A, data physically stored in location 620B is transferred to corresponding offset location 642C, and data physically stored in location 620C is transferred to corresponding offset location 642B.

Additionally, after the data has been transferred to the destination pool 1 626, the data in locations 620A-C is freed within the source pool 0 622. Further, full volume extents 618A-C are updated to point to link to the new data storage locations within the destination pool 1 626. For example, volume extent 0 618A within volume 0 604 includes a link to rank offset 0 642A for rank 3 624 of pool 1 626. Additionally, volume extent 3 618B within volume 0 604 includes a link to rank offset 3 642B for rank 3 624 of pool 1 626. Further, volume extent 129 618C within volume 0 604 includes a link to rank offset 65 642C for rank 3 624 of pool 1 626.

In this way, data may be migrated from the source pool 0 622 to the destination pool 1 626, and the volume 0 604 may be updated to reflect the migration.

Figure 6D:
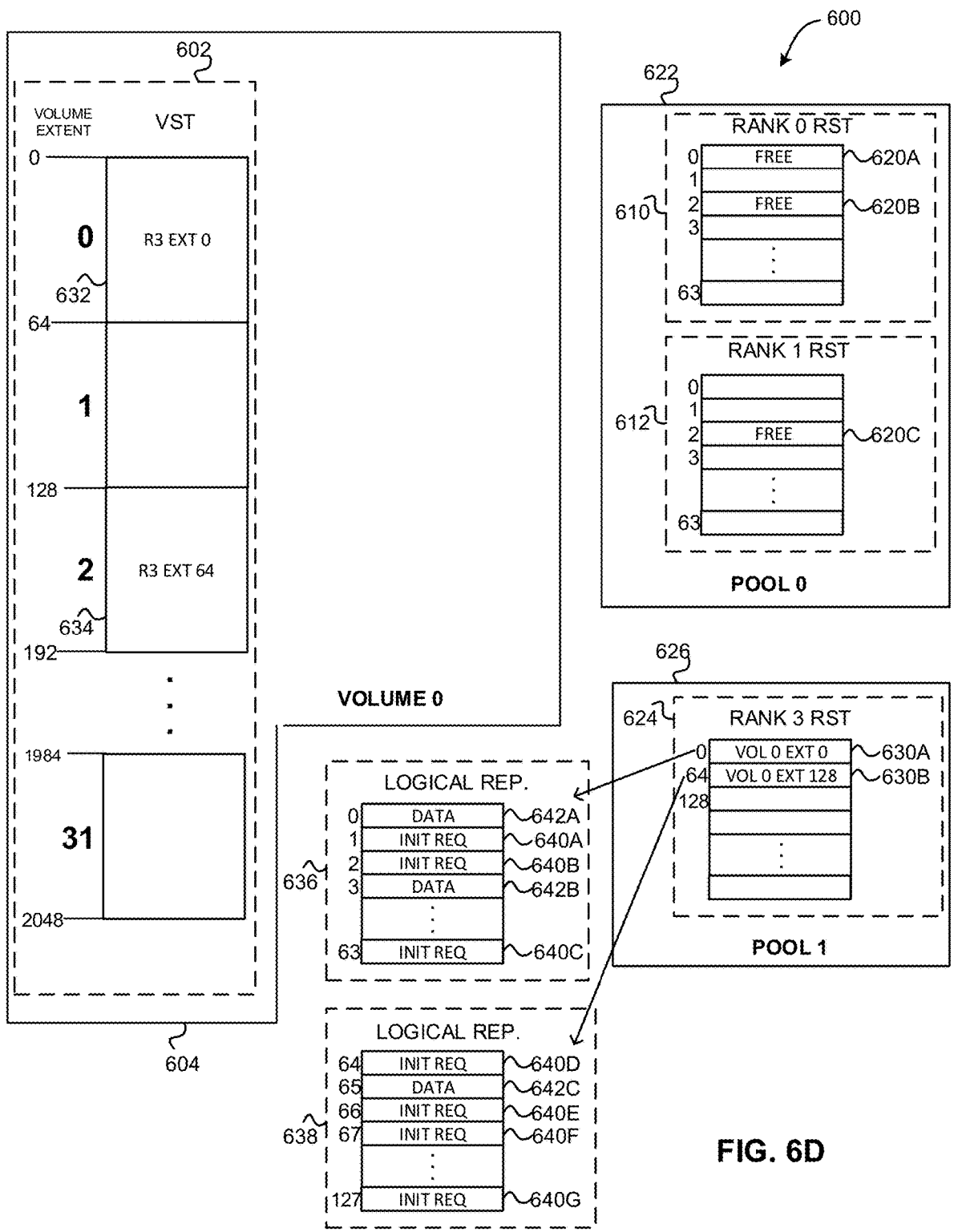
FIG. 6D illustrates an exemplary storage environment after volume extent reduction has occurred in response to a data migration, in accordance with one embodiment.

FIG. 6D illustrates an exemplary storage environment 600 after volume extent reduction has occurred in response to a data migration, according to one embodiment. As shown, small VSTs 614 and 616 used to represent the volume extents within VST entry 0 632 and VST entry 2 634 (as shown in FIGS. 6A-C) are removed, and VST entry 0 632 and VST entry 2 634 are updated to point to allocated rank extents 630A and 630B within the destination rank 3 624 in the destination pool 1 626.

In this way, an order of volume extents within VST entry 0 632 and VST entry 2 634 of the volume 0 604 may match an ordering of offsets within the allocated rank extents 630A and 630B where data associated with those volume extents is now stored.

Migration of Volumes from a Small Extent Pool to a Large Extent Pool

In one embodiment, a Rank Segment Table (RST) is a mapping table for a rank(array) describing the state of rank extents and the logical volume extents that the physical rank extents belong to. For example, say rank r0 is 1T, and extent size is 1G, then this RST table would have 1024 entries, with each entry representing one physical extent. If rank extent 0 is allocated to logical extent 1 of volume 0x1010, then the entry in RST will have information indicating that the physical extent state is allocated, and it's allocated to logical extent 1 of volume 0x1010.

Additionally, in one embodiment, a Volume Segment Table (VST) is a mapping table for volumes that maps the logical extent of the volume to the physical extent of the rank, so that we can easily identify the physical location when host I/O arrived which is on volume LBA boundary. Only RST is persistent in disks and VST is built and load into memory on demand based on the RST.

Further, in one embodiment, the following steps provide for extent migration from a small extent pool to a large extent pool:

1. Pre-check to make sure the migration request can be fulfilled.
2. Quiesce a Thin Provisioning write if it's a Thin Provisioning volume.
3. Update a volume extent pool ID to the targeting extent pool, turn on a volume flag to indicate that a space allocation is in progress and harden the volume structure.
4. Allocate targeting RST objects for the customer data.
5. As for Thin Provisioning volume, if all the corresponding 64 small extents in the source extent pool are already allocated, the targeting large extent will be marked as DSR_TGT. However, if any of those 64 small extents are in unallocated state, the targeting RST will be marked as TGT_CMPLT and QUICK_INIT_REQUIRED.
6. Allocate targeting RST objects for metadata.
7. Resume Thin Provisioning write if it's a Thin Provisioning volume.
8. Harden changed RST objects by using RST changed bitmap.
9. Quiesce Thin Provisioning write if it's a Thin Provisioning volume.
10. Build a VST from the RST in master by using the RST changed bitmap to update the unallocated smVST entries to target small chunks and send mail to peer LPAR to sync smVST track by track. Note that the smVST is pointed to the targeting large rank segment offset in 16 MB units. For example, the large extent is rank 2, segment 64, then the rank segment in smVST is updated to 65, 66, 67, 68 . . . for rank 2 (This step is valid only for Thin Provisioning volumes).
11. Quick Init will be performed on those small chunks whose source were unallocated and incoming IO for those unallocated source small extents will be redirected to targeting extent afterwards.
12. Resume Thin Provisioning write if it's a Thin Provisioning volume.
13. Turn off the volume allocation flag, turn on a volume migration flag and harden the volume structure.
14. Proceed to migrate volume extents.
15. Process to migrate data from source extent pool in small extent unit, also hold I/O in 16 MB unit.
16. Switch to metadata update phase once the customer data from the source extents are all in target.
17. Change and harden the state of target RST to TGT_CMPLT state if it's the FIRST 16 MB being migrated (skip this step if target is already in TGT_CMPLT state).
18. Change and harden the state of source RST to copy complete state (SRC_MIGRATE_CMPLT).
19. Update smVST to point to the new target small chunk on all available clusters.
20. Free smVST if it is the LAST 16 MB being migrated.
21. Release all held stage & destage I/O.
22. CACHE SCAN to have CACHE destage all modified tracks in the extent.
23. Set and harden the source extent to free pending state.
24. Free the source extent.
25. Change and harden the state of target RST to ALLOCATED state if it's the LAST 16 MB being migrated.

Allocating Space and Quick Initializing the Target Extent

In one embodiment, space is pre-allocated in the targeting extent pool before migration starts in 1 GB large extent size unit. For example, a 1 GB large extent equals 64 16 MB small extents, and if any small extent within the 1 GB range is allocated, there will be 1 GB space pre-allocated in the target pool. If all the related small extents within the 1 GB range are not allocated yet, there is no need to provision space in the target pool.

As for the Thin Provision volume, if all the corresponding 64 small extents in the source extent pool are already allocated, the targeting large extent will be marked as DSR_TGT. However, if any of those 64 small extents are in an unallocated state, the targeting RST will be marked as DSR_TGT_CMPLT and QI_REQUIRED. After the targeting RSTs are hardened, microcode builds the VST from the RST by using the RST changed bitmap to update the unallocated VST entries to point them to the related small chunks in the targeting large extent. A quick initialization will be performed on those small chunks whose sources were unallocated and incoming I/O for those unallocated source small extents will be redirected to targeting extent afterwards. If all 64 small extents are in an unallocated state, the smVST object will be freed. The smVST update mentioned above needs to be synced between storage nodes.

Holding Back End I/O

The backend I/O is held in 16 MB small extent units. During the migration of the 16 MB small extents to the related small chunks in the large extent, backend I/O is written to both the source and the target as migration is being performed from the source to the target. A switch is made to a metadata update phase once the customer data from the source small extents are mostly in target. The source/target RST state is changed to indicate the copy is complete and I/O is switched to the target afterwards.

Handling Migration Interrupt Due to Planned/Unplanned Reboot

When migration is interrupted by a planned/unplanned reboot, part of the 1 GB data is in the source pool and the other part of the data is in the target pool. When determining how to choose which copy to use, and how to build the VST to map to the correct rank segments, the rule of thumb is that small always triumphs. The process is to scan the ranks and build VSTs for each RST that's either in TGT_CMPLT or ALLOCATED state. An RST from a small rank (e.g., a rank with a small granularity) always overwrites an RST from a large rank (e.g., a rank with a larger granularity than the small rank). In other words, if there are two RSTs in an ALLOCATED state, one is a small extent, the other is a large extent, then the small RST will always be chosen to build the VST. This is because the I/O has not been switched to target if source is still in ALLOCATED state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a request to migrate data associated with a volume from a source storage pool having rank extents with a first rank extent size to a destination storage pool having rank extents with a second rank extent size greater than the first rank extent size;
   creating a correspondence between logical volume extents of the volume and physical offset locations within rank extents of the destination storage pool, the rank extents each including a predetermined portion of storage allocated within a corresponding storage pool; and
   migrating data from one or more ranks of the source storage pool to one or more ranks of the destination storage pool, according to the correspondence between the logical volume extents of the volume and the physical offset locations within the rank extents of the destination storage pool.

2. The computer-implemented method of claim 1, wherein creating the correspondence includes allocating one or more rank extents within the destination storage pool.

3. The computer-implemented method of claim 1, wherein creating the correspondence includes populating empty volume extents of the volume with corresponding offset locations within one or more allocated rank extents within the destination storage pool.

4. The computer-implemented method of claim 1, wherein creating the correspondence includes marking previously unallocated volume extents to be initialized within the volume.

5. The computer-implemented method of claim 1, wherein creating the correspondence includes marking offset locations to be initialized within one or more allocated rank extents, where the offset locations correspond to previously unallocated volume extents within the volume.

6. The computer-implemented method of claim 1, wherein migrating the data includes transferring the data associated with the volume from one or more rank extents within the source storage pool to one or more offset locations within one or more allocated rank extents of the destination storage pool.

7. The computer-implemented method of claim 1, wherein migrating the data includes adjusting the logical volume extents within the volume to point to one or more offset locations within one or more allocated rank extents of the destination storage pool that store transferred data.

8. The computer-implemented method of claim 1, wherein migrating the data includes freeing the data from one or more rank extents within the source storage pool.

9. The computer-implemented method of claim 1, further comprising reducing a representation of the logical volume extents within the volume.

10. The computer-implemented method of claim 1, wherein the rank extents of the destination storage pool are located within a redundant amount of storage within the destination storage pool.

11. The computer-implemented method of claim 1, further comprising allocating a number of rank extents within the destination storage pool that corresponds to a size of the volume.

12. The computer-implemented method of claim 11, wherein the rank extents are allocated serially.

13. The computer-implemented method of claim 11, wherein the rank extents are allocated non-serially.

14. A computer program product for migrating data from a small extent pool to a large extent pool, the computer program product comprising a computer readable storage medium having program instructions embodied therewith, wherein the computer readable storage medium is not a transitory signal per se, the program instructions executable by a processor to cause the processor to perform a method comprising:
   identifying, utilizing the processor, a request to migrate data associated with a volume from a source storage pool having rank extents with a first rank extent size to a destination storage pool having rank extents with a second rank extent size greater than the first rank extent size;
   creating, utilizing the processor, a correspondence between logical volume extents of the volume and physical offset locations within rank extents of the destination storage pool, the rank extents each including a predetermined portion of storage allocated within a corresponding storage pool; and
   migrating, utilizing the processor, data from one or more ranks of the source storage pool to one or more ranks of the destination storage pool, according to the correspondence between the logical volume extents of the volume and the physical offset locations within the rank extents of the destination storage pool.

15. The computer program product of claim 14, wherein creating the correspondence includes allocating, utilizing the processor, one or more rank extents within the destination storage pool.

16. The computer program product of claim 14, wherein creating the correspondence includes populating, utilizing the processor, empty volume extents of the volume with corresponding offset locations within one or more allocated rank extents within the destination storage pool.

17. The computer program product of claim 14, wherein creating the correspondence includes marking, utilizing the processor, previously unallocated volume extents to be initialized within the volume.

18. The computer program product of claim 14, wherein creating the correspondence includes marking, utilizing the processor, offset locations to be initialized within one or more allocated rank extents, where the offset locations correspond to previously unallocated volume extents within the volume.

19. The computer program product of claim 14, wherein migrating the data includes transferring, utilizing the processor, the data associated with the volume from one or more rank extents within the source storage pool to one or more offset locations within one or more allocated rank extents of the destination storage pool.

20. The computer program product of claim 14, wherein migrating the data includes adjusting, utilizing the processor, the logical volume extents within the volume to point to one or more offset locations within one or more allocated rank extents of the destination storage pool that store transferred data.

21. The computer program product of claim 14, wherein migrating the data includes freeing, utilizing the processor, the data from one or more rank extents within the source storage pool.

22. A system, comprising:
a processor; and
logic integrated with the processor, executable by the processor, or integrated with and executable by the processor, the logic being configured to:
identify a request to migrate data associated with a volume from a source storage pool having rank extents with a first rank extent size to a destination storage pool having rank extents with a second rank extent size greater than the first rank extent size;
create a correspondence between logical volume extents of the volume and physical offset locations within rank extents of the destination storage pool, the rank extents each including a predetermined portion of storage allocated within a corresponding storage pool; and
migrate data from one or more ranks of the source storage pool to one or more ranks of the destination storage pool, according to the correspondence between the logical volume extents of the volume and the physical offset locations within the rank extents of the destination storage pool.

23. A computer-implemented method, comprising:
identifying a request to migrate data associated with a volume from a source storage pool to a destination storage pool;
allocating one or more rank extents within the destination storage pool, the one or more rank extents each including a predetermined portion of storage within a corresponding storage pool;
populating empty volume extents of the volume with corresponding offset locations within the allocated one or more rank extents within the destination storage pool;
marking previously unallocated volume extents to be initialized within the volume;
marking offset locations to be initialized within the allocated one or more rank extents, where the marked offset locations correspond to the previously unallocated volume extents within the volume;
transferring the data associated with the volume from one or more rank extents within the source storage pool to one or more offset locations within the allocated one or more rank extents of the destination storage pool;
adjusting volume extents within the volume to point to the one or more offset locations within the allocated one or more rank extents of the destination storage pool that store the transferred data;
freeing the data from the one or more rank extents within the source storage pool; and
reducing a representation of the volume extents within the volume.

24. The computer-implemented method of claim 23, wherein the source storage pool has a first rank extent size, and the destination storage pool has a second rank extent size larger than the first rank extent size.

25. A computer program product for migrating data from a small extent pool to a large extent pool, the computer program product comprising a computer readable storage medium having program instructions embodied therewith, wherein the computer readable storage medium is not a transitory signal per se, the program instructions executable by a processor to cause the processor to perform a method comprising:
identifying, utilizing the processor, a request to migrate data associated with a volume from a source storage pool to a destination storage pool;
allocating, utilizing the processor, one or more rank extents within the destination storage pool, the one or more rank extents each including a predetermined portion of storage within a corresponding storage pool;
populating, utilizing the processor, empty volume extents of the volume with corresponding offset locations within the allocated one or more rank extents within the destination storage pool;
marking, utilizing the processor, previously unallocated volume extents to be initialized within the volume;
marking, utilizing the processor, offset locations to be initialized within the allocated one or more rank extents, where the marked offset locations correspond to the previously unallocated volume extents within the volume;
transferring, utilizing the processor, the data associated with the volume from one or more rank extents within the source storage pool to one or more offset locations within the allocated one or more rank extents of the destination storage pool;
adjusting, utilizing the processor, volume extents within the volume to point to the one or more offset locations within the allocated one or more rank extents of the destination storage pool that store the transferred data;
freeing, utilizing the processor, the data from the one or more rank extents within the source storage pool; and
reducing, utilizing the processor, a representation of the volume extents within the volume.

\* \* \* \* \*